United States Patent [19]
Seki et al.

[11] Patent Number: 4,831,406
[45] Date of Patent: May 16, 1989

[54] POWER CIRCUIT FOR CAMERA

[75] Inventors: Youichi Seki; Hiroshi Yamazaki; Hiroyuki Saito; Michio Taniwaki, all of Tokyo, Japan

[73] Assignee: Seikosha Co., Ltd., Japan

[21] Appl. No.: 170,747

[22] Filed: Mar. 21, 1988

[30] Foreign Application Priority Data

Mar. 20, 1987 [JP] Japan .................................. 62-66480

[51] Int. Cl.⁴ .............................................. G03B 7/26
[52] U.S. Cl. ..................................... 354/484; 354/412
[58] Field of Search ................................ 354/484, 412

[56] References Cited

U.S. PATENT DOCUMENTS

| | | | |
|---|---|---|---|
| 4,269,494 | 3/1981 | Shiozawa et al. | 354/484 |
| 4,304,475 | 12/1981 | Kitai et al. | 354/484 |
| 4,522,480 | 6/1985 | Kawabata et al. | 354/484 |
| 4,561,754 | 12/1985 | Matsuyama | 354/484 |
| 4,621,914 | 11/1986 | Taniguchi et al. | 354/484 |
| 4,645,326 | 2/1987 | Kiuchi et al. | 354/484 |
| 4,662,736 | 5/1987 | Taniguchi et al. | 354/484 |

FOREIGN PATENT DOCUMENTS

| | | | |
|---|---|---|---|
| 0042524 | 3/1984 | Japan | 354/484 |
| 0048739 | 3/1984 | Japan | 354/484 |
| 0188934 | 9/1985 | Japan | 354/484 |

*Primary Examiner*—Russell E. Adams
*Attorney, Agent, or Firm*—Bruce L. Adams; Van C. Wilks

[57] ABSTRACT

A power circuit for a camera comprising a power activation means containing a release switch for activating the camera, a step-up means for starting to step up the voltage of a battery by the power activation means, a CPU which is driven by an output of the step-up means so as to control the operation of the camera and which has a reset terminal for stopping the operation, and a voltage detecting means for detecting the output voltage of the step-up means and for generating a detection signal when the voltage is lower than a set value which has previously been determined, the set value being set to correspond to the limiting operation voltage of the CPU and, when the output voltage of the step-up means is lower than the limiting operation voltage of the CPU, the CPU being reset and stopped to operate.

3 Claims, 3 Drawing Sheets

POWER CIRCUIT FOR CAMERA

FIELD OF THE INVENTION

The present invention relates to a power source for a camera which is used in a small camera that uses a microcomputer and a step-up power source as a power source for the microcomputer that resets when the voltage of the step-up power source is lower than the limiting operation voltage of the microcomputer, i.e., less than its minimum operation voltage.

BACKGROUND OF THE INVENTION

Over the past few years, cameras have been remarkably electronized, and many operations which had previously depended on the experience and perception of human operators are now automatically performed by electronic control, for example, the control of exposure and the automatic control of a camera-to-subject distance. Microcomputers are often used as circuits for electronic control in view of the degree of freedom of control and reductions in development period.

Although a battery is generally used as a power source of a camera, the voltage of the battery in a camera that has a strobe unit or an auto-loading function for automatically rolling up films can temporarily vary. In such a camera, the source voltage of a microcomputer would also vary, resulting in malfunctioning of the microcomputer. It is therefore necessary to use a step-up power source as a source voltage of such a microcomputer.

However, there is a danger that, if the voltage of the step-up power source is not sufficiently high when the microcomputer starts up even after it has been stepped up, or if the voltage of the step-up power source is not completely stepped up and drops for some reason during the operation of the microcomputer, the operation of the microcomputer becomes unstable, resulting in malfunctioning.

PRIOR ART

FIG. 2 is a block diagram of the configuration of a conventional circuit. Heretofore, a battery voltage is directly applied to a microcomputer, with no step-up circuit being provided. Therefore, a controller X that can operate at lower voltages is used to supply power to a driver MD which drives a strobe circuit ST and a motor for rolling up and rewinding films, and a switch S for supplying the power to a microcomputer V has been controlled so that, if the battery voltage drops, the supply of the battery voltage to the microcomputer V is turned off to ensure that the microcomputer can not be used. There is therefore a disadvantage in that the usable range of battery voltage is extremely limited, and thus vital shutter release moments can be allowed to escape. Although the above-described problem can be solved by providing the controller X with many functions, it is advantageous to provide functions to the microcomputer in view of reductions in the development period and the degree of freedom of changes. It is therefore thought that the source voltage of the microcomputer could be maintained at a value above the limiting operation voltage, i.e., the minimum operation voltage, even if the battery voltage drops, by using a step-up circuit.

However, the functions of a step-up circuit are limited, and there is a danger that if, for example, the ability of the battery itself becomes lost in the last stages thereof when a film is being wound up or rewound immediately after the strobe has been charged, the step-up source voltage of the microcomputer could become lower than the minimum operation voltage and the microcomputer could run away.

SUMMARY OF THE INVENTION

The present invention has been achieved in consideration of the above-described problems, and it is an object of the present invention that, in a camera using a microcomputer, malfunctioning of the microcomputer is prevented by resetting it when the voltage of a step-up power source is lower than the minimum operation voltage of the microcomputer or becomes lower than the minimum operation voltage of the microcomputer during the operation thereof.

To achieve this object, the present invention comprises a power activation means containing a release switch for activating a camera, a step-up means for starting the step-up of a battery voltage by the power activation means, a CPU which controls the operation of the camera by being driven by the output of the step-up means and which has a reset terminal for stopping the operation, and a voltage detecting means which detects the output level of the step-up means and generates a detection signal if the output level is lower than a previously-determined set value, the set value being set to correspond to the limiting operation voltage of the CPU and the detection signal being connected to the reset terminal so that the operation of the CPU is stopped when the output of the step-up means is lower than the limiting operation voltage of the CPU.

DETAILED DESCRIPTION OF THE INVENTION

Figure 1:
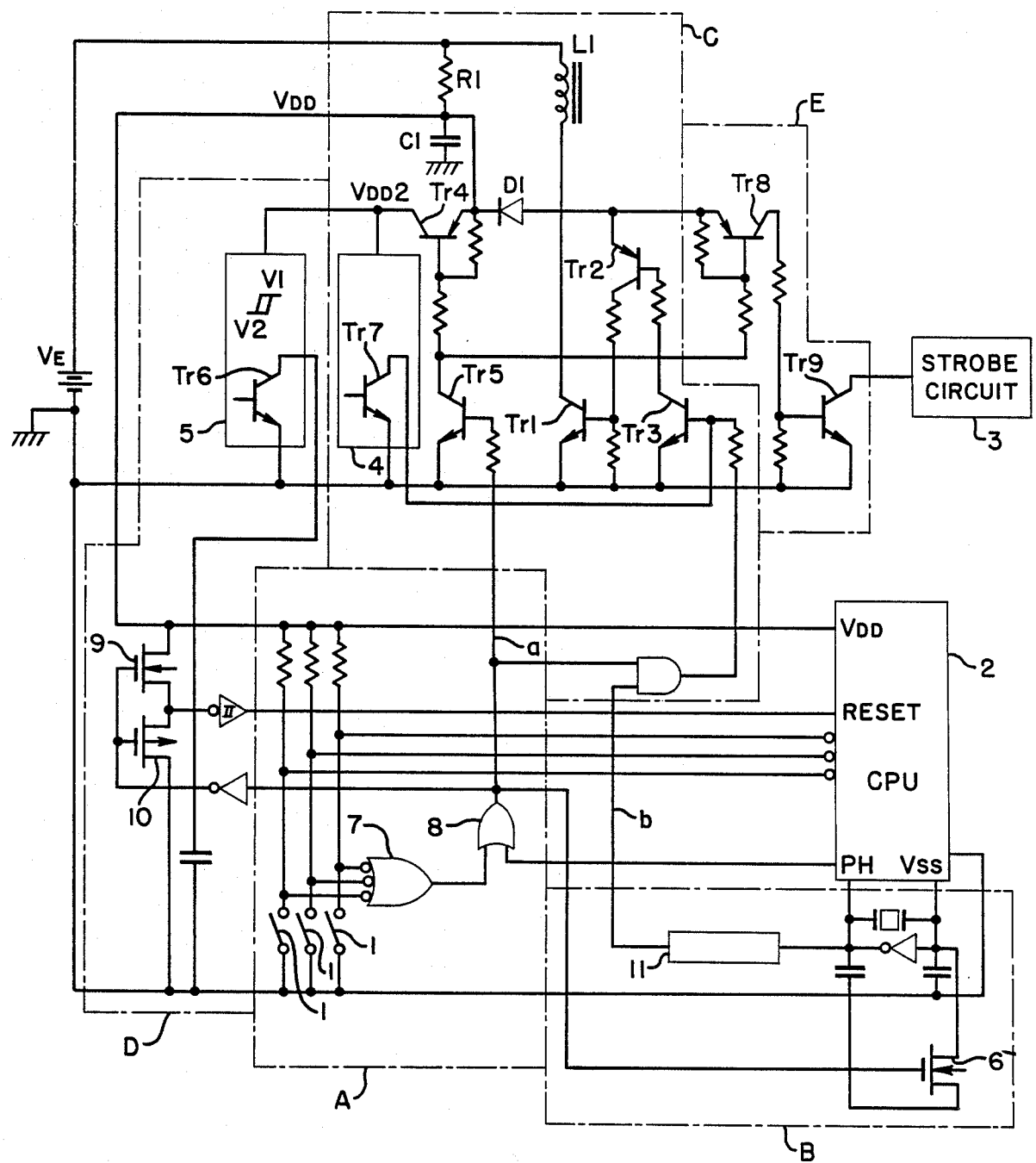
FIG. 1 is a block diagram of a circuit of an embodiment of the present invention.
Figure 2:
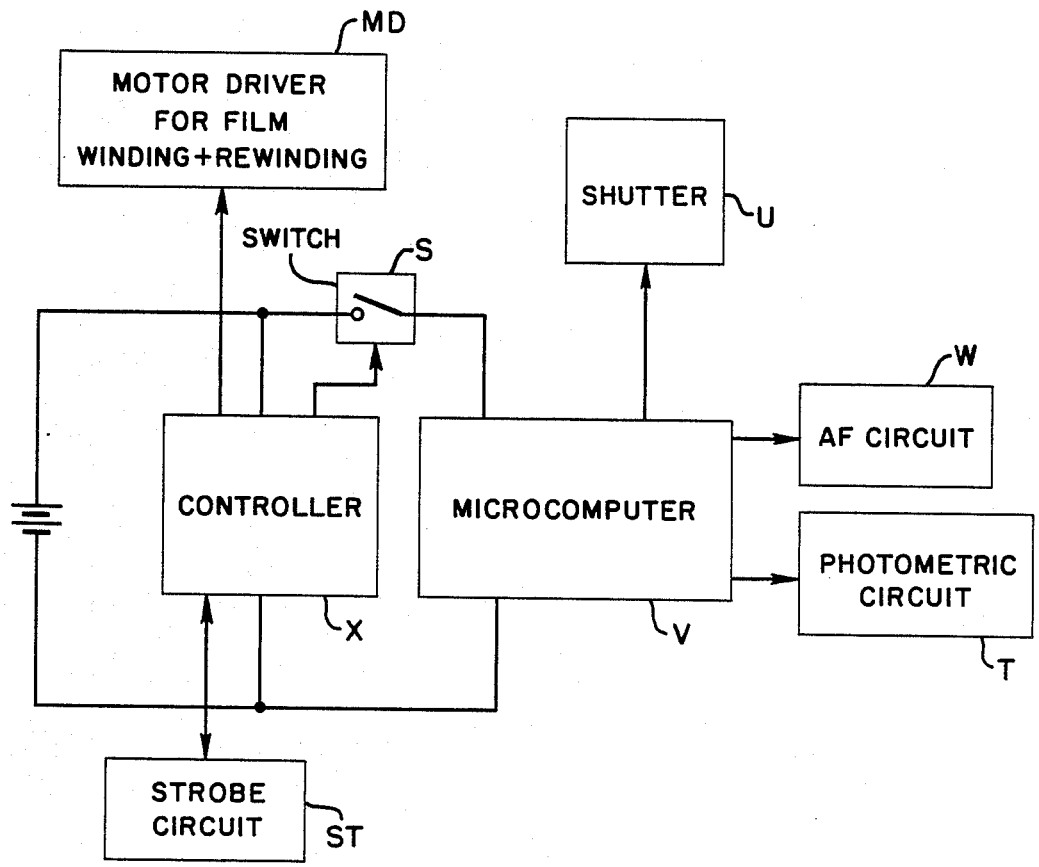
FIG. 2 is a block diagram of a conventional circuit.

In FIG. 1, a portion A surrounded by a broken line in the figure denotes a power activation unit, and a power activation switch group 1, for example, comprises a shutter release switch and a film-rewinding switch. A CPU 2 determines which switch has activated the power source and performs a given process. For example, if the power source is turned on by the shutter release switch, exposure is performed, then the film is automatically rolled on.

If any one of the switches of the power activation switch group 1 turns on the power source, the output of an OR gate 8 via DR gate 7, i.e., an output a of the power activation unit A, goes high and a start signal is sent to each of the units. The power activation cause that produced the output is also output to the CPU 2. A PH signal connected to one input terminal of the OR gate 8 is set when a program in the CPU 2 is started, so that the output a of the power activation unit A is maintained at high even if the power activation switch group 1 is turned off during the operation of the CPU 2. A portion B surrounded by a broken line denotes an oscillator in which, when the output a of the power activation unit A goes high, an N-channel FET 6 is turned off so that oscillation is started and is output to the CPU 2. A step-up clock b is also output to a step-up circuit unit C through a frequency division circuit 11. When the output a of the power activation unit A goes low, the N-channel FET 6 is turned on so that oscillation is stopped and the current consumed by the standby oscillator B becomes zero.

In a standby state wherein the output a of the power activation unit A is low, all of transistors Tr1, Tr2, and Tr3 are turned off. Thus, a step-up power source $V_{DD}$ is made to be $V_E$ ($V_E$=battery voltage) by a resistor R1, a step-up coil L1, and a diode D1. Since, at the same time, transistors Tr4 and Tr5 are both turned off, when $V_{DD}=V_E$, the current consumed by the step-up circuit C becomes substantially zero. The resistor R1 is a resistor for increasing the step-up power source $V_{DD}$ to the battery voltage $V_E$.

A description will now be made of the step-up circuit unit C. When the step-up clock is input to the transistor Tr3, it is amplified by the transistors Tr2 and Tr1 so as to switch the step-up coil L1. When the transistor Tr1 is turned on, a current passes through the step-up coil L1, and, when it is turned off, the energy stored in the step-up coil L1 is stored in a capacitor C1 through the diode D1. If the voltage $V_{DD}$ of a capacitor C1 is above a given value, a transistor Tr7 is turned on and the transistor Tr3 is turned off so that the input of the step-up clock is stopped. If the voltage $V_{DD}$ falls below the given value, the transistor Tr7 is turned off so that the step-up clock is input. Therefore, the voltage $V_{DD}$ is stepped up to a substantially constant voltage.

When the output a of the power activation unit A goes high, the transistors Tr5 and Tr4 are turned on so that the step-up power source $V_{DD}$ is applied to a $V_{DD}$ detecting regulator 4 and the step-up clock is input to the transistor Tr3 to start the stepping up. The $V_{DD}$ detecting regulator 4 controls the step-up clock b input to the base of the transistor Tr3 so as to stabilize the step-up power source $V_{DD}$ (the transistor Tr7 is turned on or off by the voltage of $V_{DD}$).

When the output a of the power activation unit A goes low, the stepping up is immediately stopped so that the voltage of the step-up power source $V_{DD}$ gradually comes closer to the battery voltage $V_E$.

A portion D surrounded by a broken line denotes a circuit for controlling the resetting of the CPU 2. A $V_{DD}$ detecting resetter 5 turns off the transistor Tr6 when the voltage of the step-up power source $V_{DD}$ becomes higher than $V_1$, and turns on the transistor Tr6 when $V_{DD}$ becomes lower than $V_2$. $V_1$ and $V_2$ are each set at a value slightly higher than the minimum operation voltage of the CPU.

When the output a of the power activation unit A is low, the transistor Tr4 is turned off so that the source voltage $V_{DD}$ is not applied to the $V_{DD}$ detecting resetter 5. In addition, the output of an inverter comprising FETs 9 and 10 goes low so that the CPU 2 is reset. At this point, the current consumed by the reset circuit unit D becomes substantially zero. When the output a of the power activation unit A goes high, the output of the inverter also goes high, and the voltage of the step-up power source $V_{DD}$ is immediately applied to the $V_{DD}$ detecting resetter 5. At this point, if $V_{DD} < V_1$, the transistor Tr6 is turned on so that the CPU 2 is kept in the reset state. If $V_E \geq V_1$ i.e., if $V_{DD} \geq V_1$, the reset state is immediately removed. Therefore, if $V_{DD}$ is lowered for some reason and becomes less than $V_2$ during the operation of the CPU 2, the transistor Tr6 is turned on so that the CPU is reset, preventing runaway. Hysteresis is imparted to the $V_{DD}$ detecting resetter 5 since $V_1 > V_2$.

A portion E surrounded by a broken line denotes a strobe step-up inhibiting signal output unit in which, when the output a of the power activation unit A goes high, transistors Tr8, Tr9 are turned on so as to inhibit strobe step-up and, when the output a goes low, the transistors Tr8, Tr9 turned off so as to release the inhibition of the strobe step-up.

$V_{DD}$ is always applied to the CPU 2. When the reset is released, the program is started, the PH signal is reset so that the output a of the power activation unit A is kept high, and the CPU 2 checks which of the power activation switches activated the power source and performs a given operation.

Even if the power activation switch group 1 is turned off while the CPU 2 is operating, the operation can continue because the PH signal is set. When the given operation is completed, the PH signal is reset and, if the power activation switch group 1 has been turned off at this point, the CPU is reset. If the power activation switch group 1 is turned on, the CPU is reset when the group 1 is turned off.

On Standby

When the device is on standby, in which all the switches of the power activation switch group 1 are turned off and no operation is being performed, the capacitor coil $C_1$ is charged with the battery voltage $V_E$ by the step-up coil $L_1$, the diode $D_1$, and the resistor $R_1$, so the output a of the power activation unit A goes low and the N-channel FET 6 is turned on, so that the oscillator unit B is not operated. In addition, the transistors Tr1, Tr2, Tr3, Tr4, and Tr8 are turned off and the output of the inverter comprising FETs 9 and 10 in the reset circuit unit D goes low, so that the current consumed from the battery voltage $V_E$ becomes substantially zero. This means that, during standby, the battery voltage is applied to the CPU 2.

During Power Charge

If one of the switches of the power activation switch group 1 is turned on when the device is on standby, the output a of the power activation unit A goes high and the oscillator unit B starts to oscillate. At the same time, the step-up clock 6 is applied to the base of the transistor Tr5 so as to start the stepping up, and the transistors Tr2 and Tr6 are turned on so as to output a strobe step-up inhibiting signal. The step-up power $V_{DD}$ detection is applied to the $V_{DD}$ detecting resetter 5 and the $V_{DD}$ detecting regulator 4.

In this state, if the battery voltage is higher than $V_1$, the reset is removed by the output from the $V_{DD}$ detecting resetter so that the program is started. Alternatively, if the battery voltage is lower than $V_1$, the reset state is held by the output from the $V_{DD}$ detecting resetter 5. Thereafter, when the step-up power voltage $V_{DD}$ becomes higher than $V_1$, the reset is removed so that the program is started. When the program is started, the CPU 2 checks which power activation switch has started the power source, and the PH signal from the CPU is set so that the operation corresponding to the selected switch of the power activation switch group 1 is started. While the CPU is operating, its operation is continued by the PH signal even if the power activation switch group 1 is turned off.

When the given operation has been completed, the PH signal is reset, and, if the power activation switch group 1 is not on at this point, the output a of the power activation unit goes low and the CPU 2 is immediately reset so that it is on standby. If the power activation switch group 1 is on, the CPU is reset when the power activation switch group is turned off, so wait on standby. While it is on standby, if the battery voltage drops during strobe step-up, immediately after strobe step-up, or immediately after the film has been rolled up, and if the power activation switch group 1 has been turned on, the reset state is maintained until the voltage of the step-up power source $V_{DD}$ becomes higher than $V_1$.

During Operation

If the voltage of the step-up power source $V_{DD}$ falls below $V_2$ for some reason during operation (for example, the falling out or instantaneous cutting of the battery), the CPU 2 is immediately reset by the signal of the $V_{DD}$ detecting resetter 5 so as to prevent runaway. In addition, the transistor Tr5 is turned on and the transistors Tr8, Tr9 are thus turned on, so that step-up of the strobe circuit 3 is inhibited during operation.

After Operation

Figure 3:
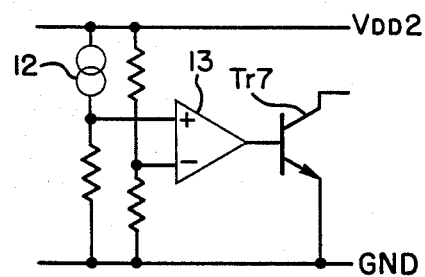
FIG. 3 is a circuit diagram of a $V_{DD}$ detecting regulator 4.
Figure 4:
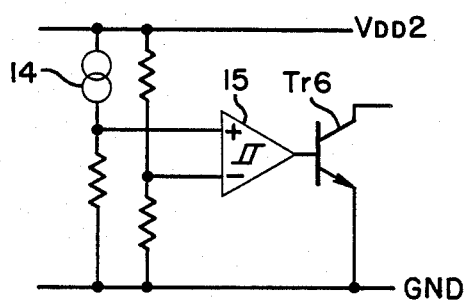
FIG. 4 is a circuit diagram of a $V_{DD}$ detecting resetter 5.

After the operation of the CPU 2 has been completed, the CPU 2 is reset. Therefore, if the power activation switch group 1 is turned off when the PH signal is reset, the output a of the power activation unit A goes low, so the transistor Tr5 is turned on to ensure that the step-up is stopped and the CPU is reset. The oscillation of the oscillator B is also stopped so that the device returns to the standby state. If the operation is completed in the state wherein the power activation switch group 1 is on, the device returns to the standby state when the power activation switch group 1 is turned off. The $V_{DD}$ detecting resetter 5 comprises a known comparator 15, a unit 14 for generating a constant current source, and a breeder resistor for detecting $V_{DD}$, as shown in FIG. 4. The $V_{DD}$ detecting regulator 4 including contrast current source 12, comparator 13 and a resistor is constructed in the same manner as the detecting resetter 5, as shown in FIG. 3. The embodiment of the present invention employs each of the circuit units A to E independently of the CPU, but any of these circuits may be formed on the same chip as the CPU.

Effects

As described above, the present invention has the effect that it can prevent runaway of a microcomputer, which is the most difficult phenomenon to prevent in an instrument using a microcomputer, and also brings about no undesirable malfunctioning and no increase in the current consumed while the device is on standby, and can realize control with some degree of freedom.

What is claimed is:

1. A power circuit for a camera comprising:
    power activation means containing a release switch for activating a camera;
    step-up means for starting to step up the voltage of a battery in response to activation by said power activation means;
    a CPU driven by an output of said step-up means to control the operation of said camera and having a reset terminal for stopping said operation;
    voltage detecting means for detecting the output level of said step-up means for detecting the output level of said step-up means and for generating a detection signal when said level is lower than a set predetermined value, wherein said set value corresponds to a limiting operation voltage of said CPU; and means applying said detection signal to said reset terminal to stop the operation of said CPU when the output of said step-up means is lower than said limiting operation voltage of said CPU.

2. A power circuit for a camera, comprising:
    switching means for connecting a camera to a battery to activate same;
    means responsive to the activation of the camera for stepping up the battery voltage;
    a central processing unit receptive of the stepped up voltage for energizing same when the stepped up voltage is greater than a lower limiting voltage, to control operations of the camera, the unit having a reset input responsive to a signal applied thereto for resetting the unit; and
    means for detecting the level of the stepped up voltage and for producing a detection signal when the stepped up voltage is a set value greater than the lower limiting voltage and for applying same to the reset input to reset the central processing unit.

3. The circuit according to claim 2, further comprising stand-by means for applying the battery voltage to the central processing unit to energize same when the camera is not activated.

* * * * *